(12) United States Patent
Friede et al.

(10) Patent No.: US 6,894,447 B1
(45) Date of Patent: May 17, 2005

(54) ELECTRICALLY ACTUATED SLIDE ROOM EXTENSION

(75) Inventors: John Friede, Walcott, IA (US); Mitchell P. Schmalz, Iowa City, IA (US)

(73) Assignee: HWH Corporation, Moscow, IA (US)

( * ) Notice: Subject to any disclaimer, the term of this patent is extended or adjusted under 35 U.S.C. 154(b) by 241 days.

(21) Appl. No.: 10/064,437

(22) Filed: Jul. 12, 2002

(51) Int. Cl.⁷ .............................. H02K 7/10; B62P 3/34
(52) U.S. Cl. ................................. 318/14; 318/3; 318/9; 296/26.01; 296/26.03; 296/176
(58) Field of Search .............................. 318/3, 6, 9, 14, 318/599–632, 245–254; 296/171, 172, 175, 176, 26.01, 26.13

(56) References Cited

U.S. PATENT DOCUMENTS

| | | | | |
|---|---|---|---|---|
| 5,997,074 A | * | 12/1999 | Alexander | 296/176 |
| 6,345,854 B1 | * | 2/2002 | McManus | 296/26.13 |
| 6,471,275 B1 | * | 10/2002 | Kunz et al. | 296/26.01 |
| 6,536,823 B2 | * | 3/2003 | McManus | 296/26.13 |
| 6,575,514 B2 | * | 6/2003 | McManus et al. | 296/26.01 |
| 2002/0057000 A1 | * | 5/2002 | McManus | 296/26.13 |

* cited by examiner

Primary Examiner—Paul Ip
(74) Attorney, Agent, or Firm—James C. Nemmers

(57) ABSTRACT

A system for extending and retracting expandable rooms in vehicles. The system employs linear actuators that can be mounted laterally to the direction of movement of the room when it is expanded or extended. In order to provide for extending and retracting the room, the actuators are connected to heavy chains which are connected to the main body of the vehicle structure and which will flex in one direction only. The chains ride in tracks such that when the actuators are retracted, the room will be extended, and when the actuators are extended, the room will be retracted. The system includes infrared sensors that sense movement of each chain to produce a signal that is used to synchronize movement of all of the actuators as the room is extended or retracted.

5 Claims, 5 Drawing Sheets

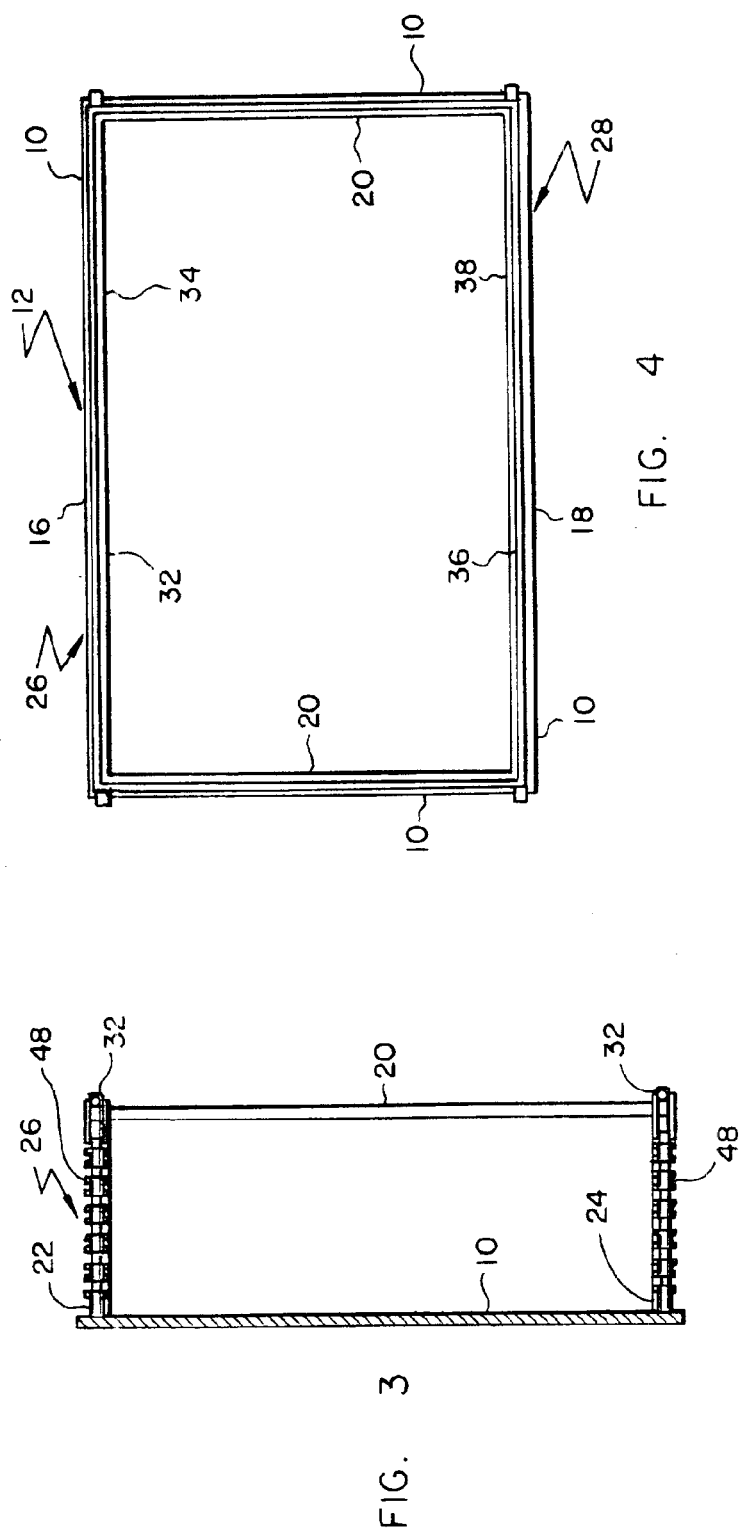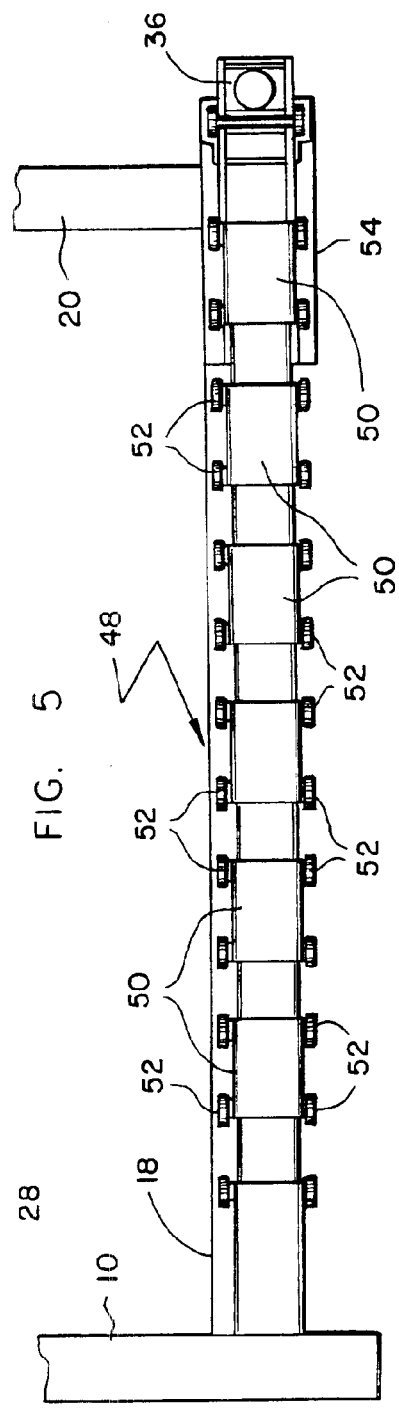

US 6,894,447 B1

ELECTRICALLY ACTUATED SLIDE ROOM EXTENSION

BACKGROUND OF INVENTION

Recreational and similar vehicles have been known and used for years for traveling, camping and other purposes and also have been used as multiple purpose vehicles that permit individuals to be transported and to live for short periods of time in the vehicles. Because these vehicles are driven over public highways, there are limitations on the widths of the vehicles, and such limitations restrict the amount of interior room that is available for living when the vehicle is parked off the road. To overcome these limitations and to provide more useable living space when the vehicle is parked, there have been designed expandable rooms that can be extended while the vehicle is parked and retracted while the vehicle is moving over the road. Such expandable rooms greatly improve the utility of the vehicles for not only recreational purposes, but also for use in transporting small groups, such as entertainers, who spend a considerable amount of time on the road and move from location to location frequently. Some of these vehicles are quite luxurious, and in addition to their usefulness in maximizing the available space, aesthetics are very important.

Since the expandable rooms are quite massive, the mechanism for expanding them and then retracting them requires a considerable amount of power. Typically, expansion and retraction is accomplished using hydraulic power since most of these vehicles have hydraulic systems available for other purposes. The known systems therefore use linear actuators to expand and retract the room, but known systems are designed in such a way that the actuators and the associated components are visually exposed and therefore undesirable from an appearance standpoint. In addition, the known systems are such that the linear actuators capture valuable space and therefore take away from otherwise useable space. There is therefore a need for an improved system for accomplishing the expansion and retraction of expandable rooms in an efficient manner with a minimum of space required for the operating mechanisms. There is also a need for providing operating system in which the mechanisms can be hidden from view and thus greatly improving the overall appearance of these vehicles and making them more appealing to the users. There is a further need for such operating systems that will assure that the four corners of the room will be extended in a synchronized manner so as to properly extend the room smoothly and efficiently.

SUMMARY OF INVENTION

The system of the invention for extending and retracting expandable rooms in vehicles employs linear actuators that can be mounted laterally to the direction of movement of the room when it is expanded or extended. The primary components of the system, the linear actuators, electric motors and sensors, are mounted on the structural members of the room and thus occupy very little, if any, additional space. In order to provide for extending and retracting the room, the actuators are connected to heavy chains which are connected to the main body of the vehicle structure and which will flex in one direction only. The chains ride in tracks such that when the actuators are retracted, the room will be extended, and when the actuators are extended, the room will be retracted. The system is also provided with synchronizing sensors that synchronize the movement of the four chains, one controlling each corner of the expandable room. If one chain should get ahead of the others, this will be sensed, and the actuator controlling it will be shut off to allow the lagging ones to catch up. This provides for smooth and even extension and retraction of the room.

BRIEF DESCRIPTION OF DRAWINGS

FIG. 3 is a side elevational view of the basic room structure and showing the room in a retracted position;

FIG. 4 is an interior elevational view of the room structure;

FIG. 5 is an enlarged side view of a portion of the lower part of the room structure to illustrate in more detail the chain mechanism;

DETAILED DESCRIPTION

Figure 1:
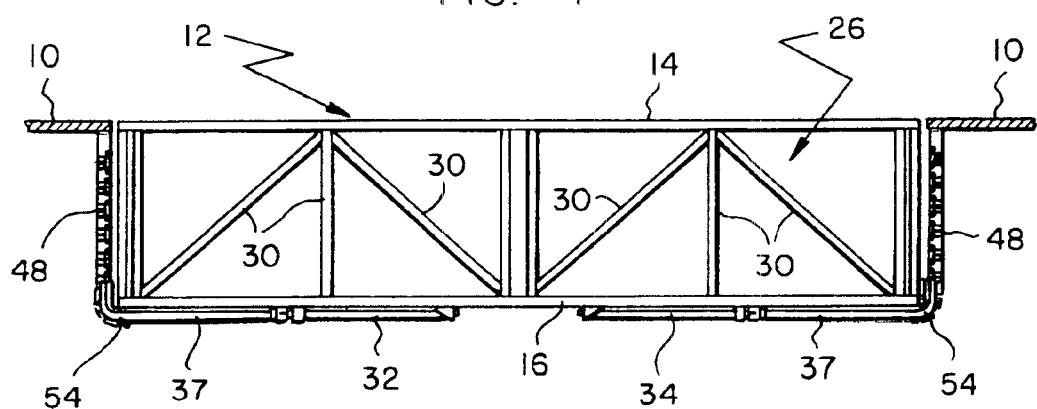
FIG. 1 is a top or plan view illustrating the basic exterior wall of a vehicle and the structure of the room and showing the room extending inwardly in a fully retracted position.
Figure 2:
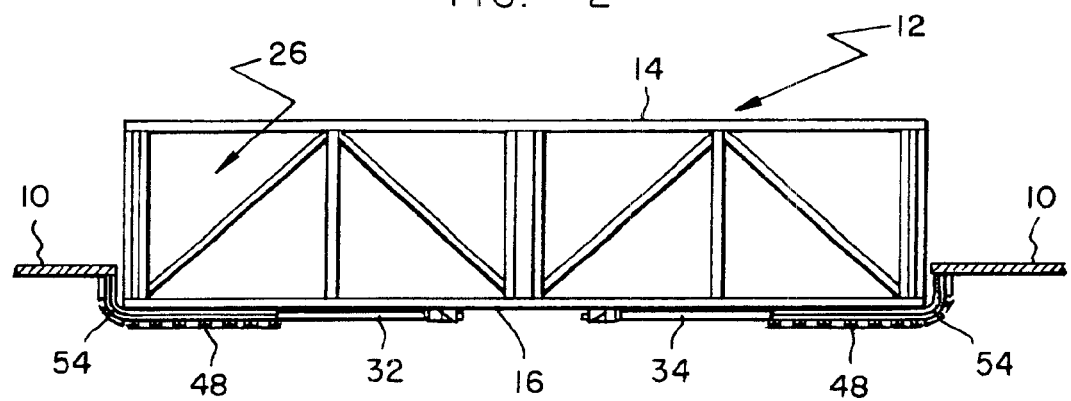
FIG. 2 is a plan view similar to FIG. 1 but showing the room extending outwardly in the extended position.

The invention is for use in connection with vehicles of the type that have an expandable room. An example of such a vehicle with an expandable room is shown in Hanser U.S. Pat. No. 6,067,756. Referring now to the drawings, and particularly FIGS. 1 and 2, vehicles of this type have a side exterior wall 10 through which an expandable room, indicated generally by the reference numeral 12, can be extended outwardly. The room 12 can also be retracted so that the outside wall 14 of the expandable room 12 is flush with the exterior wall 10 of the vehicle when the room 12 is fully retracted. The expandable room 12 is shown in the drawings in an outline form that illustrates the basic structural members for a rectangular or box-like structure of the room. In addition to the outside wall 14 the room 12 has an interior upper structural member 16 and an interior lower structural member 18 joined by interior vertical members 20. The interior upper structural member 16 is connected to the outside wall 14 of the room 12 by horizontal outwardly extending side upper members 22 and side lower members 24. Thus, the interior upper structural members 16 and the side upper members 22 form a top wall 26 of the room 12 while the interior lower structural member 18 and the side lower members 24 form a bottom wall 28. Suitable bracing members 30 (FIGS. 1 and 2) complete the top wall 26 and bottom wall 28.

Figure 6:
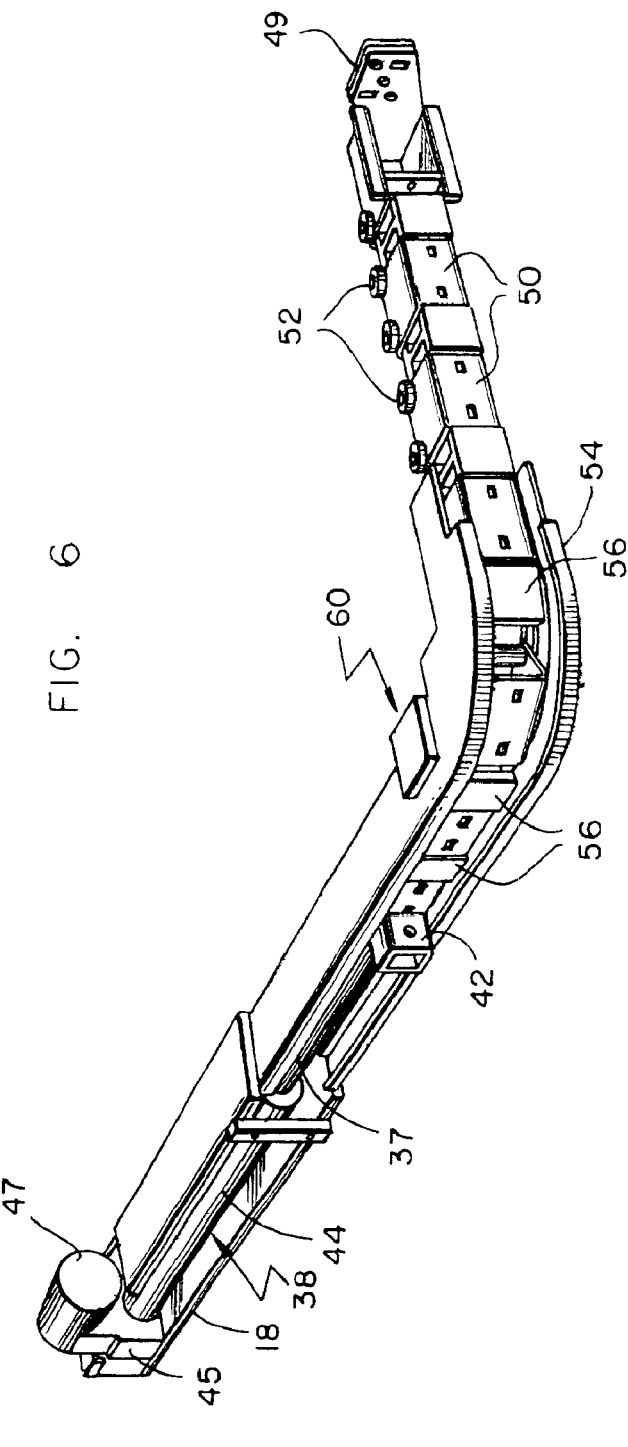
FIG. 6 is an enlarged perspective view of a portion of the operating system for one of the corners of the room structure to show details of the actuator and chain mechanisms.

FIG. 1 shows the expandable room 12 in the fully retracted position in which the outside wall 14 of the room 12 is flush with the exterior wall 10 of the vehicle while FIG. 2 shows the expandable room 12 in the extended position. In order to provide for movement of the expandable room from these two positions, there is mounted on the interior upper structural member 16 and extending along the member 16 a pair of upper linear actuators 32 and 34. Similarly, along the interior lower structural member are a pair of lower linear actuators 36 and 38. Each of the linear actuators 32, 34, 36 and 38 has an operating rod 37 extending for connection to the respective one of the chains 48. This is illustrated more clearly in FIG. 6 which is an enlarged view of one of the actuators 38 and its connection to the chain 48. FIG. 6 shows a portion of the interior lower structural member 18 with its linear actuator 38 mounted thereon and with the operating rod 37 affixed to the chain 48 by a bracket 42. The main body 44 of the linear actuator 38 is mounted so as to be fixed to the structural member 18 by a mounting bracket 45 which also supports the electric motor 47 that powers the actuator 38. It will be understood that each of the actuators 32, 34, 36 and 38 is similarly mounted, connected and powered, even though only one of the them is described hereinafter.

As best seen in FIG. 5, the chain 48 consists of a plurality of interconnected links 50 each of which has a pair of roller bearings 52 that ride along the respective one of the interior structural members 16 or 18 or the side members 22 or 24. With one end of each chain 48 connected to one of the linear actuators 32, 34, 36 or 38, the other end of each chain 48 is connected to the exterior wall 10 by bracket 49 (see FIG. 6). The chain 48 is of a well known commercially available type which will flex in one direction only with the links 50 pivoting about their vertical axes. Thus when each chain 48 is pulled under action of the linear actuators 32, 34, 36 or 38, the room 12 will move from the fully retracted position shown in FIG. 1 to the fully extended position shown in FIG. 2. In order to move the room 12 from the extended position shown in FIG. 2 back to the fully retracted position of FIG. 1, the chains 48 must be "pushed" by action of the linear actuators. In order to provide for this action of the chains 48 and to prevent the chains from moving outwardly as they move around the corners where the interior horizontal structural members 16 and 18 join the side structural members 22 and 24, there is provided at each corner a guide 54 which has flanges 56 that extend towards the structural member to contain the roller bearings 52 on the links 50 of the chain 48 and thus prevent them from moving outwardly. The chains 38 will therefore withstand the compressive forces exerted by the linear actuators and retract the room 12. Thus, with this structure of the invention, and with a chain and linear actuator at each of the four corners of the expandable room 12, the room 12 can be easily and smoothly extended and retracted relative to the exterior side wall 10 of the vehicle. The room 12 will of course be provided with suitable supporting structure in a manner that is well known to those skilled in the art.

The linear actuators 32, 34, 36 and 38 are all connected in an electrical control system. It is important that all of the linear actuators be synchronized so that the chains 48 will be pulled or pushed precisely at the same time and at the same speed. Further, it is important that the actuators be maintained in check against force differentials that may be introduced when the moving room passes its center of gravity and attempts to tip, thus exerting a force on the operating rods of the actuators to move responsively to the effects of gravity upon the room rather than responsively to the actuators themselves. Finally, it is important to note that the actuators do provide for a locking system to prevent the rooms from expanding or retracting when such motion is not desired (i.e. to prevent expansion while the vehicle is in motion and retraction when occupied).

Figure 7:
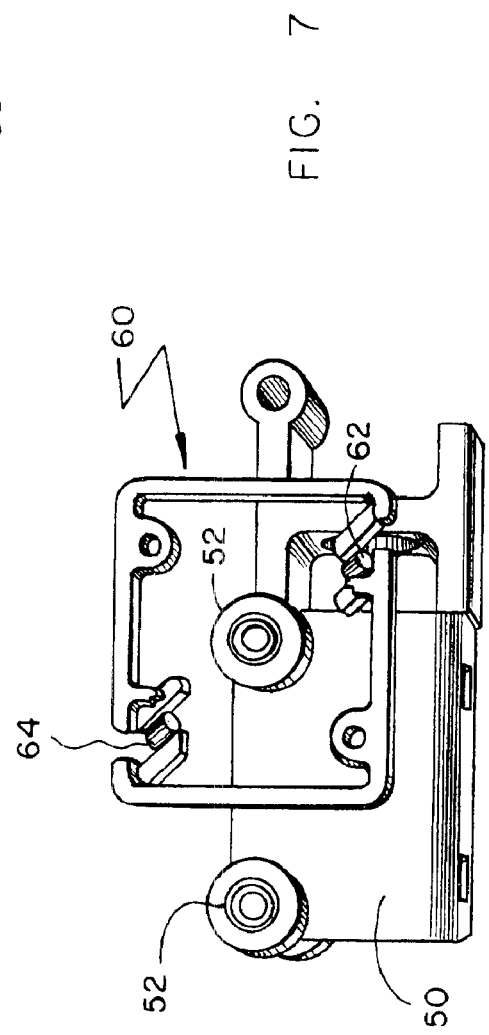
FIG. 7 is an enlarged view of one of the infra red sensors.

Referring now to FIGS. 6 and 7, there is illustrated the components for synchronizing the movement of the chains 48 to assure that movement of the room 12 does not become misaligned during extension or retraction. FIG. 7 is an enlarged top view, with the cover removed, of an infrared sensor 60 that is mounted on the structural member 18 of room 12 along the path of the roller bearings 52 of the chain 48. The infrared sensor 60 includes an emitter LED 62 and a detector LED 64, and when a roller bearing 52 passes between LEDs 60 and 62, a detection signal is broken and transmitted to a counter 66 that forms a part of the electrical control system illustrated in FIGS. 8 and 9.

Figure 8:
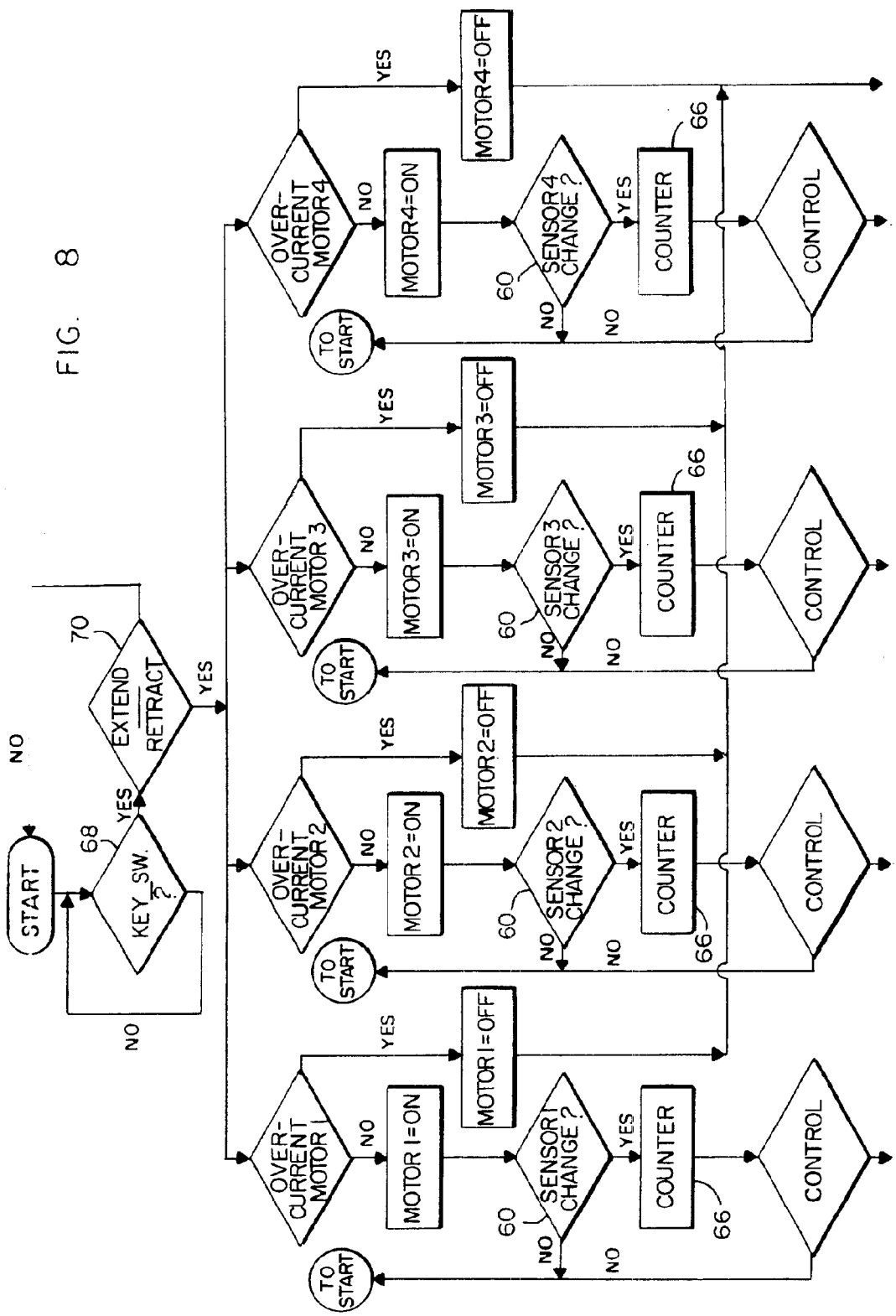
FIG. 8 is a first part of a flow chart of the control system.
Figure 9:
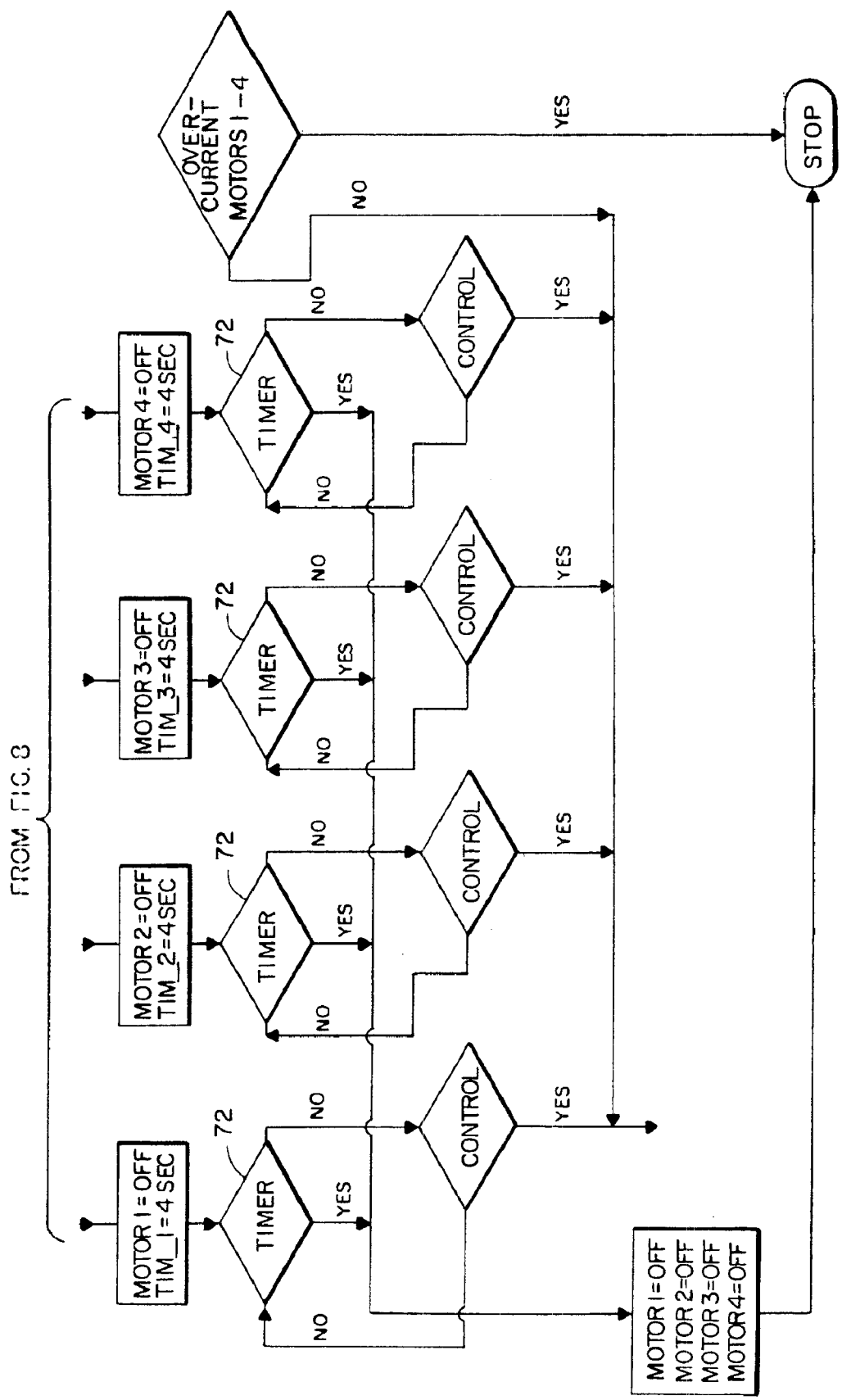
FIG. 9 is the second part of the flow chart of the control system.

Referring now to FIGS. 8 and 9, the electrical control system is shown in a flow chart in which FIG. 8 is a part of the chart and FIG. 9 the completion of it. It will be understood that the arrows leading from the boxes labeled "Control" at the bottom of FIG. 8 are connected to the boxes labeled "Motor" at the top of FIG. 9 thereby forming a single flow chart. These two figures show the motors 47 (which are numbered 1, 2, 3 and 4) and sensors 60 (which are correspondingly numbered 1, 2, 3 and 4) for each of the linear actuators 32, 34, 36 and 38. When the key switch 68 on the operator's panel is "ON", and if the rocker switch 70 is moved to "Extend" (or "Retract"), the system is active. Obviously, the switch 70 is moved to "Extend" if the room 12 is to be extended, and to "Retract" if the room is already extended and it is desired to retract the room.

During extension of the room 12, if one or more of the actuators 32, 34, 36 or 38 get 2 or more "counts" ahead of another as determined by the counter 66, those actuator(s) will be shut off to allow the ones lagging to catch up. When all actuators' counts are equal and thus synchronized, normal operation will resume. If the lagging actuators do not catch up within a predetermined time, e.g., 4 seconds, as determined by a timer 72 for each motor 47, the control system will shut down all motors indicating an out-of-sync condition. After a shut down due to out-of-sync, the system will not allow further extension of the room until the key switch 68 has been cycled "OFF-ON". Retraction however will not be inhibited.

When the room 12 reaches its fully extended position or if a failure occurs that prohibits the room from extending any farther, each motor 47 will be shut down individually as its current draw reaches a predetermined amperage, e.g., 9 amps. After a shut down due to current, all the actuators 32, 34, 36 and 38 must move the chains 48 through at least one count in the opposite direction before they will be allowed to move again in the original direction. This may be overridden by cycling power to the control system.

A slight delay may be noticed between the time extend or retract is initiated and when the motors 47 actually start running. This delay is to avoid false triggering of the current sensors due to the back EMF generated by the motors 47 when turned off.

If the room 12 is extended and it is desired to retract the room, the key switch 68 on the operator's panel is turned to "ON". The rocker switch 70 is then turned to "Retract" and the room 12 will start moving to its fully retracted position. However, if during retraction one or more of the actuators 32, 34, 36 or 38 get 2 or more "counts" ahead of another, the motors 47 to those actuator(s) will be shut off to allow the ones lagging to catch up. When all actuators' counts are synchronized, normal operation will resume. As previously described for the extension cycle, a count is incremented to the counter 66 each time a roller bearings 53 passes through the infrared sensor 60 thereby changing the state of the signal sent to the control system. If the lagging actuators do not catch up within the predetermined time of four seconds, as set in the timers 72, the system will shut down, indicating an out-of-sync condition. After a shut down due to out-of-sync, the system will not allow further retraction of the room until the key switch 68 has been cycled "OFF-ON". When the room 12 reaches its fully extended position or if a failure occurs that prohibits the room from extending any farther, each motor 47 will be shut down individually as its current draw reaches a predetermined amperage, e.g., 9 amps. After a shut down due to current, all the actuators 32, 34, 36 and 38 must move the chains 48 at least one count in the opposite direction before they will be allowed to move again in the original direction. This may be overridden by cycling power to the control system.

Similarly to the extension cycle, a slight delay may be noticed between the time extend or retract is initiated and when the motors 47 actually start running. This delay is to avoid false triggering of the current sensors due to the back EMF generated by the motors 47 when turned off.

It will be evident from the foregoing description that the system for extending the expandable room 12 and retracting it is a relatively simple system. The actuators and chains can be mounted inside of a structural member or along the side of a structural channel or I-beam. They thus occupy little or no additional space and are protected. If space is not of concern, it is possible to use the system of the invention with any type of power cylinder or actuator, with or without the chains, as long as some means is provided to produce a signal related to movement which signals can be used to produce counts for synchronizing the cylinders or actuators. The system of the invention operates the extension and retraction very smoothly, and with the synchronizing and locking actuators that form a part of the system, the system includes safeguards. The system also does not detract from the appearance of the expandable room when it is extended since the chains and actuators can be enclosed and not visible when the room is extended or retracted. The invention therefore provides for a very pleasing overall appearance which is very important especially in luxury vehicles.

Having thus described the invention in connection with the preferred embodiments thereof, it will be evident to those skilled in the art that various revisions can be made to the preferred embodiments described herein without departing from the spirit and scope of the invention. It is our intention, however, that all such revisions and modifications that are evident to those skilled in the art will be included within the scope of the following claims.

What is claimed is:

1. An electrically operated system for extending and retracting a room relative to an exterior containment wall, the room having structure that forms an outside vertical wall, an interior vertical wall and an upper wall and a lower wall joined by side walls, said system comprising:

a plurality of guide tracks combined with the interior wall at the upper and lower walls of the room and extending around the side walls where the side walls join with the upper and lower walls;

a plurality of compressive load bearing chains, one moveable in each of said tracks, each of said chains having a plurality of connected links that terminate in a first end and a second end, said chain first ends being fixed to said exterior containment wall;

a plurality of linear actuators, one for each of said chains and having an operating rod connected to a respective one of said chain second ends, the linear actuators being positioned along the interior vertical wall and mounted transversely to the direction of movement of the room;

an electrical motor operatively connected to and powering each of the linear actuators;

a sensor combined with each chain for detecting movement of each chain by counting the links as they pass the sensor to provide a signal related to the number of links passing the sensor; and a control system combined with the motors for processing the signals from the sensors to control operation of each motor and thereby synchronize movement of the chains.

2. The electrically operated system of claim 1 in which there is:

a counter for receiving the signals from each sensor; and a control processor for comparing the counted signals from the sensors and stopping an electric motor powering an actuator at one point if the counted signals from a sensor at that point exceed those from another sensor, the processor restarting the motor when the counted signals from all points again become equal.

3. The electrically operated system of claim 2 in which the chains move on rollers, and the sensors are infrared sensors that detect passage of a roller by the sensor.

4. The electrically operated system of claim 3 in which each of said tracks has a bend formed therein where the track extends around a side wall so as to provide a guide to restrain the chain traveling along the track from pulling away from the room.

5. The electrically operated system of claim 3 in which the sensors are infrared sensors.

* * * * *